(12) United States Patent
Thirumalai et al.

(10) Patent No.: US 12,307,108 B2
(45) Date of Patent: May 20, 2025

(54) DATA STORAGE DEVICE AND METHOD FOR RELEASING A SOURCE BLOCK HAVING AN UNCORRECTABLE ERROR

(71) Applicant: Western Digital Technologies, Inc., San Jose, CA (US)

(72) Inventors: Gopi Kuppan Thirumalai, Tamil Nadu (IN); Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 60 days.

(21) Appl. No.: 18/223,670

(22) Filed: Jul. 19, 2023

(65) Prior Publication Data

US 2024/0329865 A1  Oct. 3, 2024

Related U.S. Application Data

(60) Provisional application No. 63/493,795, filed on Apr. 3, 2023.

(51) Int. Cl.
*G06F 11/10* (2006.01)
*G06F 3/06* (2006.01)
*G06F 11/30* (2006.01)
*G06F 12/02* (2006.01)

(52) U.S. Cl.
CPC ............ *G06F 3/064* (2013.01); *G06F 3/0619* (2013.01); *G06F 3/065* (2013.01); *G06F 11/3037* (2013.01); *G06F 12/0253* (2013.01); *G06F 3/0679* (2013.01); *G06F 11/1004* (2013.01)

(58) Field of Classification Search
CPC ............. G06F 11/1004; G06F 11/3037; G06F 12/0253; G06F 11/0679; G06F 11/065; G06F 11/0619; G06F 11/064; G06F 3/0679; G06F 3/065; G06F 3/0619; G06F 11/1016; G06F 11/0727
See application file for complete search history.

(56) References Cited

U.S. PATENT DOCUMENTS

| | | | |
|---|---|---|---|
| 2011/0238629 A1* | 9/2011 | Post | G06F 12/0246 707/696 |
| 2015/0046772 A1* | 2/2015 | Bennett | G06F 11/1016 714/768 |
| 2015/0161034 A1* | 6/2015 | Fisher | G06F 3/0679 711/103 |
| 2016/0147468 A1* | 5/2016 | Desai | G06F 11/10 711/162 |
| 2022/0171564 A1* | 6/2022 | Ryu | G06F 3/064 |

* cited by examiner

*Primary Examiner* — Yolanda L Wilson
(74) *Attorney, Agent, or Firm* — Crowell & Moring LLP

(57) ABSTRACT

A data storage device is described that can be configured with various techniques to release a source block to a free block pool even if the source block contains an uncorrectable error in an address header in one of its clusters that would otherwise prevent the release of the source block. The various techniques can be used individually or in combination.

20 Claims, 11 Drawing Sheets

DATA STORAGE DEVICE AND METHOD FOR RELEASING A SOURCE BLOCK HAVING AN UNCORRECTABLE ERROR

CROSS-REFERENCE TO RELATED APPLICATION

This application claims priority to U.S. provisional patent application No. 63/493,795, filed Apr. 3, 2023, which is hereby incorporated by reference.

BACKGROUND

During a garbage collection operation, a source block is copied to a destination block. If an uncorrectable error occurs in a cluster in the source block, the cluster is still copied over, unless the uncorrectable error renders a logical address written in the cluster unreadable. In that situation, the cluster is left in the source block, which prevents the source block from being released to a free block pool.

DETAILED DESCRIPTION

The following embodiments generally relate to a data storage device and method for releasing a source block having an uncorrectable error. In one embodiment, a data storage device is provided comprising a memory and a controller. The controller is configured to determine that an uncorrectable error exists in a portion of a source block, wherein the portion is located at a physical address in the memory; read a logical address from a header of the portion of the source block; compare the logical address read from the header with a logical address read from an entry in a logical-to-physical address table that is associated with the physical address; and in response to the logical address read from the header matching the logical address read from the entry in the logical-to-physical address table, copy the portion of the source block to the destination block.

In another embodiment, a method is provided that is performed in a data storage device comprising a memory comprising a source block comprising a plurality of pages, wherein one of the plurality of pages stores a list of logical addresses of the other ones of the plurality of pages. The method comprises: determining that an uncorrectable error exists that prevents a logical address written in a header of a page from being read; calculating the logical address from the list of logical block addresses; writing the calculated logical address in the page; and relocating the source block to a destination block.

In yet another embodiment, a data storage device is provided comprising: a memory; and means for: determining that an uncorrectable error exists in a portion of a source block, wherein the portion is located at a physical address in the memory; reading a logical address from a header of the portion of the source block; comparing the logical address read from the header with a logical address read from an entry in a logical-to-physical address table that is associated with the physical address; and copying the portion of the source block to the destination block in response to the logical address read from the header matching the logical address read from the entry in the logical-to-physical address table.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1A:
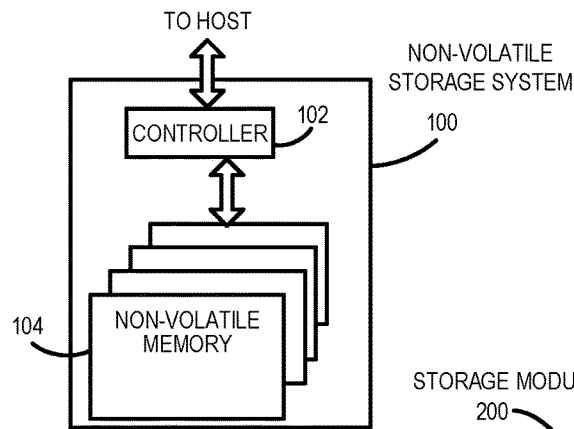
FIG. 1A is a block diagram of a data storage device of an embodiment.
Figure 1B:
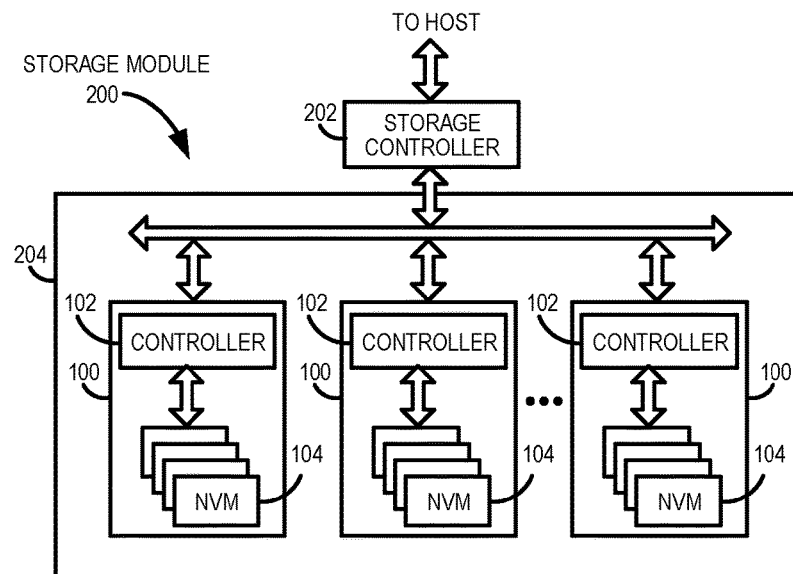
FIG. 1B is a block diagram illustrating a storage module of an embodiment.
Figure 1C:
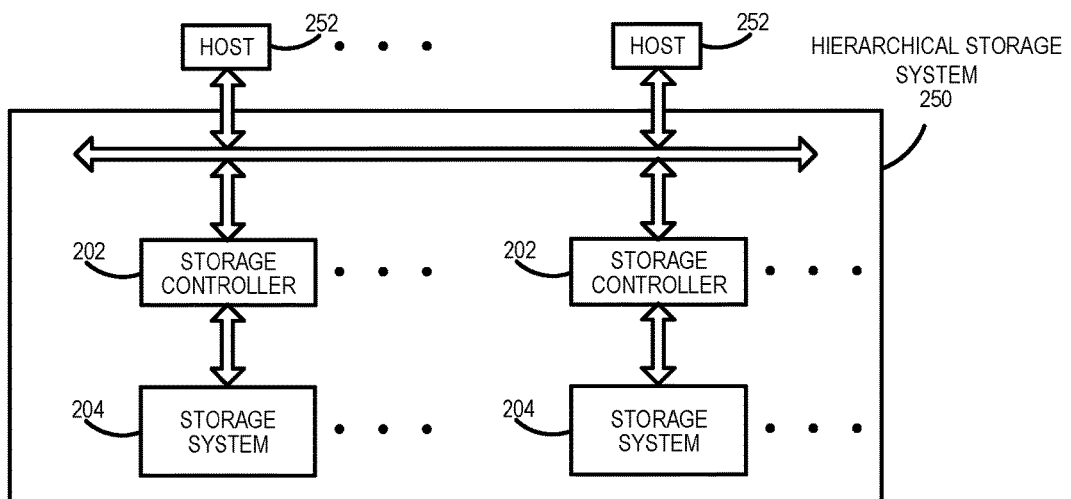
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
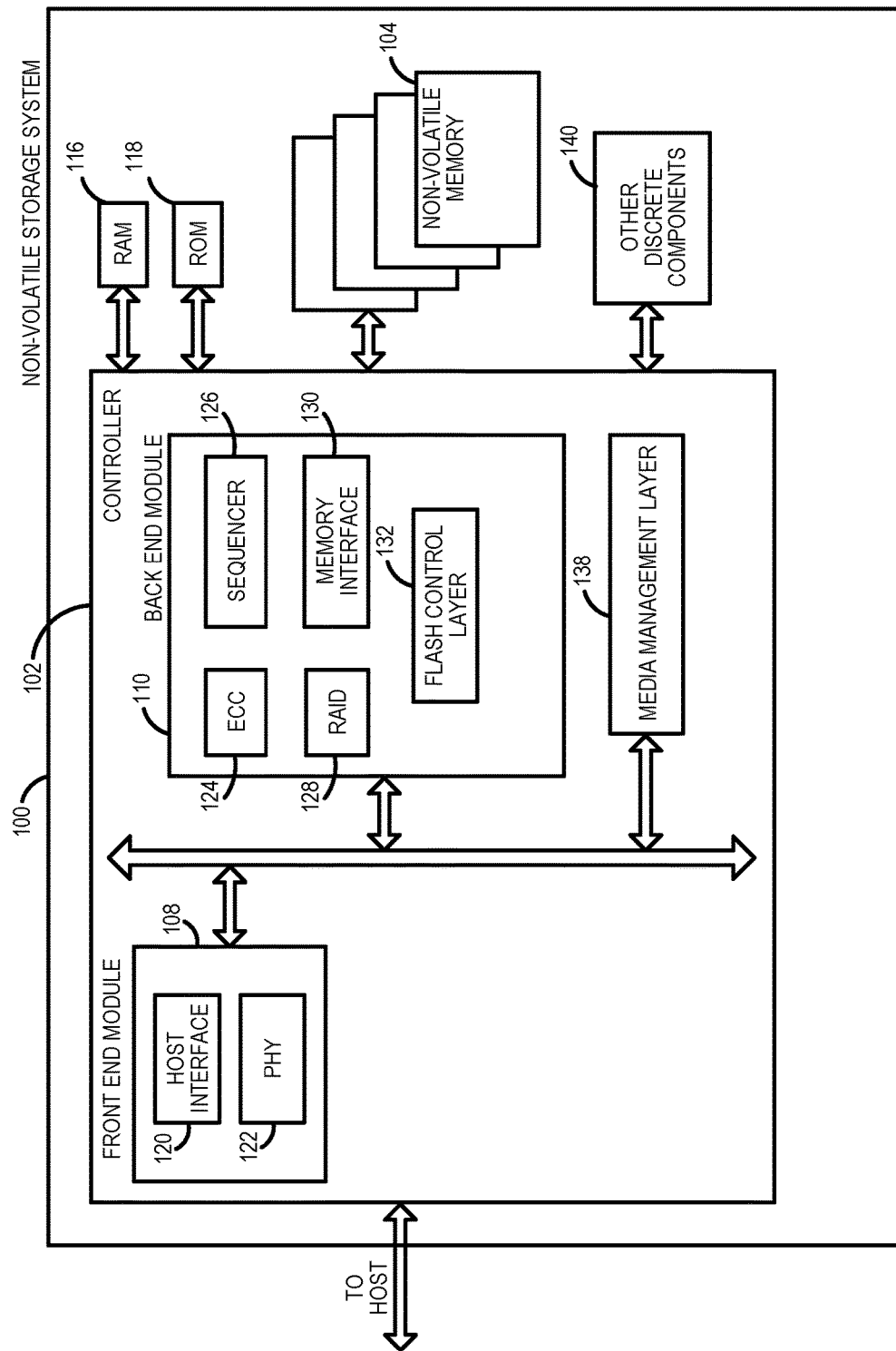
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
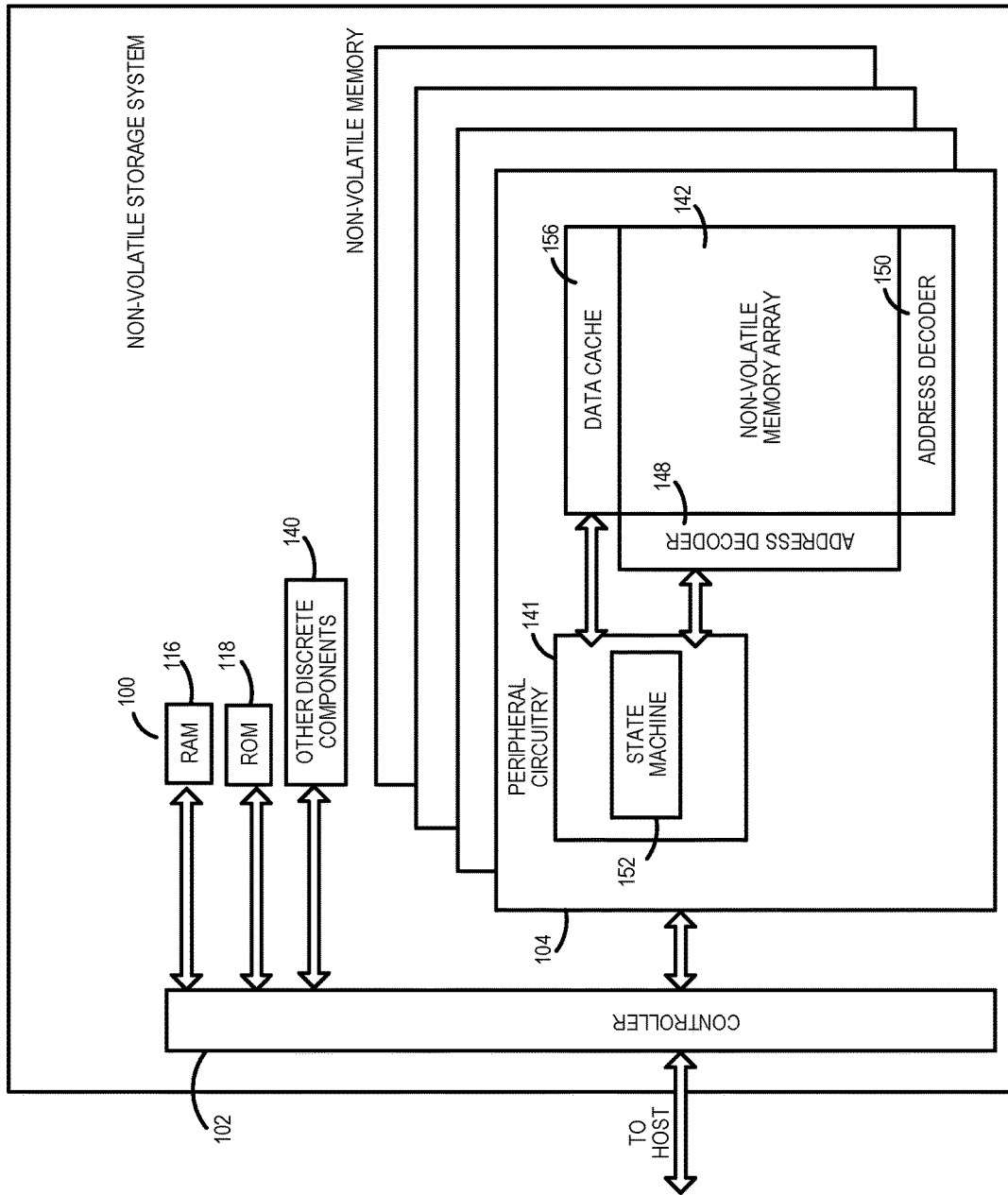
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
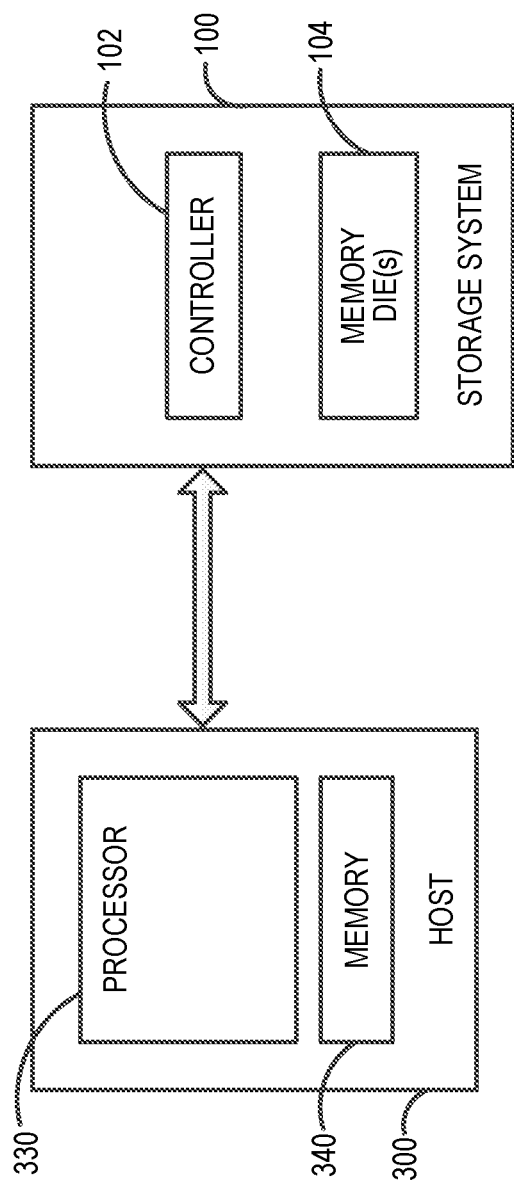
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

The controller 102 of the data storage device 100 can be configured to perform garbage collection operations in the memory 104 to moves data from a source block in the memory 104 to a destination block in the memory 104. (As used herein, a "metablock" can refer to a flash translation layer (FTL) system resource that uses a block for caching to improve performance as well as for capacity addition.) The source block comprises a plurality of portions (e.g., clusters, fragments, pages, or other units of storage), For example, a cluster (NAND packet) can have a 4 KB flash management unit (FMU) data payload, a header (e.g., a logical flash management unit (LFMU)) comprising a logical address for the cluster, and parity information for the cluster. A logical-to-physical (L2P) address table (sometimes referred to herein as a global address table (GAT)) contains an entry that associates the logical address of the cluster with the physical address in the memory 104 that stores the cluster. During garbage collection, the controller 102 reads the logical address from the header of the cluster, copies the cluster to the destination block, and then updates the entry in the logical-to-physical address table for the logical address to reflect the new physical address in the destination block where the cluster now resides after garbage collection.

Figure 4:
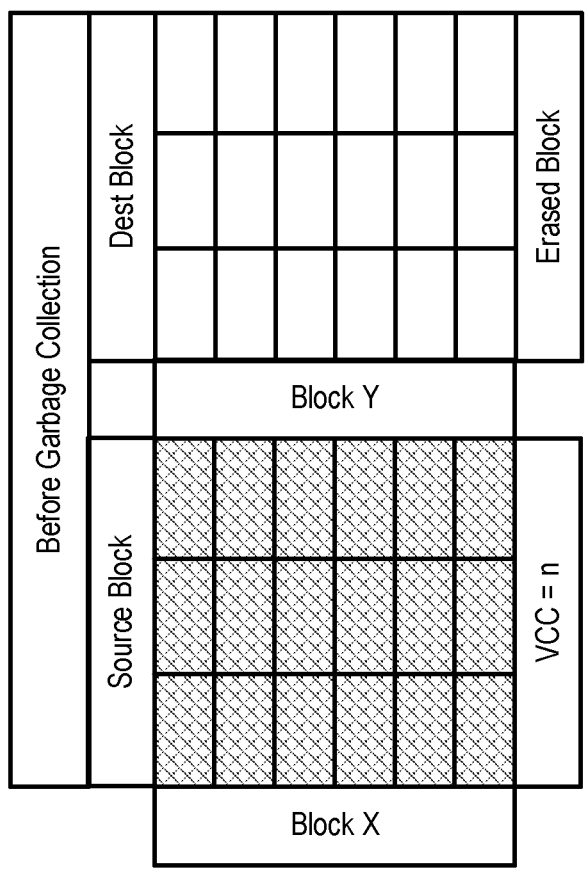
FIG. 4 is an illustration of source and destination blocks of an embodiment before garbage collection.
Figure 5:
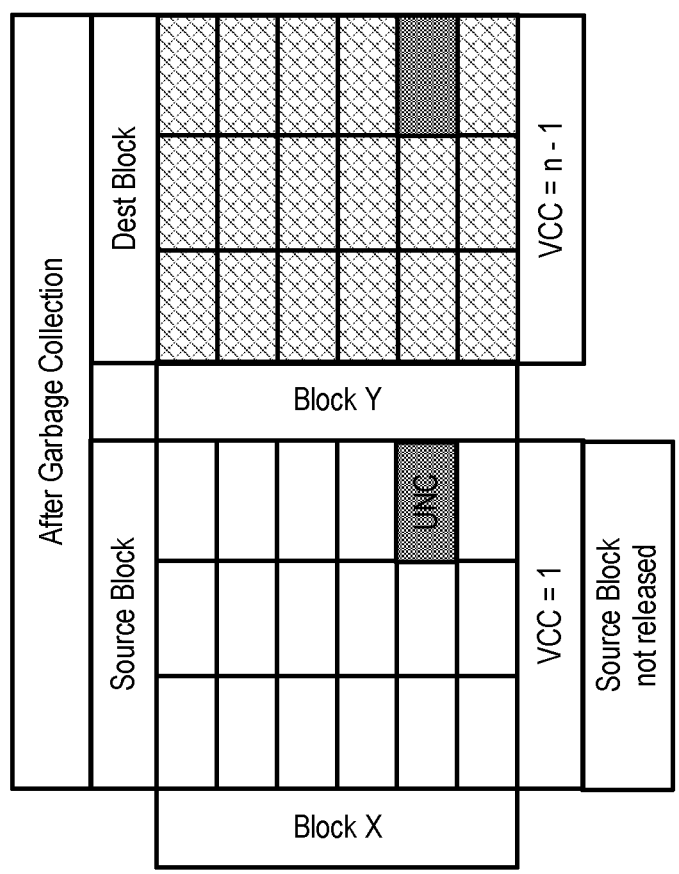
FIG. 5 is an illustration of source and destination blocks of an embodiment after garbage collection.

A problem can occur, however, when there is an uncorrectable error (e.g., an uncorrectable error correction code ((UECC) error) in the cluster (e.g., when the parity is not sufficient to correct an error in the cluster). If the uncorrectable error is in the header of the cluster, the uncorrectable error can render the logical address in the header unreadable, in which case the controller 102 would not know which entry in the logical-to-physical address table to update (because the logical address is needed to identify the entry). In this situation, the cluster with the uncorrectable error would be left in the source block, and the other clusters would be copied to the destination block. As shown in FIGS. 4 and 5, this results in a non-zero valid cluster count (VCC) in the source block after garbage collection is completed. This means that the source block cannot be released to the free block pool immediately and will be released only after a host write occurs for the same cluster, which is not guaranteed. A "left-over" cluster will sometimes be referred to herein as a "zombie cluster," and a block with a non-zero VCC after garbage collection will sometimes be referred to herein as a "zombie block." In other words, when a UECC happens in a source block, the source block gets "stuck" in an unusable state due to the presence of the UECC fragment. This state will continue until the host 300 writes to that cluster again, during which time the L2P is updated with the new location, and the "stuck" cluster gets invalidated and automatically released when the VCC is zero.

So, the data storage device 100 has a host dependency to release a source block if it has an UECC candidate in it. The more UECC candidates in a block, the more the block's dependency on the host 300. The blocks get jammed with higher program-erase count (PEC) cycles when more UECC happens in its lifetime. Further, with upcoming memory nodes, the size of the blocks keeps increasing, which puts pressure on block budget design. Having this dependency is a disadvantage for the data storage device 100 since there is no guarantee when the block would be available back to the free pool.

One way to address this problem is by using a reverse logical-to-physical address table (a "P2L" table) to identify the logical address from the physical address of the cluster. However, a P2L table is not typically managed in the data storage device in many architectures. The following embodiments provide various techniques that can be used to address the situation where there is a source block with a VCC>0 (e.g., an UECC impacted block) to release the source block to the free block pool for further usage quickly and without host involvement, thereby optimizing system resources.

One embodiment takes advantage of the fact that when an uncorrectable error in a cluster occurs, it is unlikely that the uncorrectable error is in the header, given that the size of the header is relatively small compared to the overall size of the cluster. So, in this embodiment, the controller 102 can assume that the uncorrectable error does not affect the logical address in the header. To check this assumption, the controller 102 reads the logical address from the header of the cluster and compares it with the logical address read from an entry in the logical-to-physical address table that is associated with the physical address of the cluster in the source block. If the addresses match, that means that the uncorrectable error is not in the logical address. So, the controller 102 can proceed with copying the cluster to the destination block. As a result, the source block will have a VCC of 0 instead of 1, and the source block can be released to the free block pool. Because the uncorrectable error is not in the header, the uncorrectable error is in the data payload. So, the copied cluster in the destination block will have invalid data.

Figure 6:
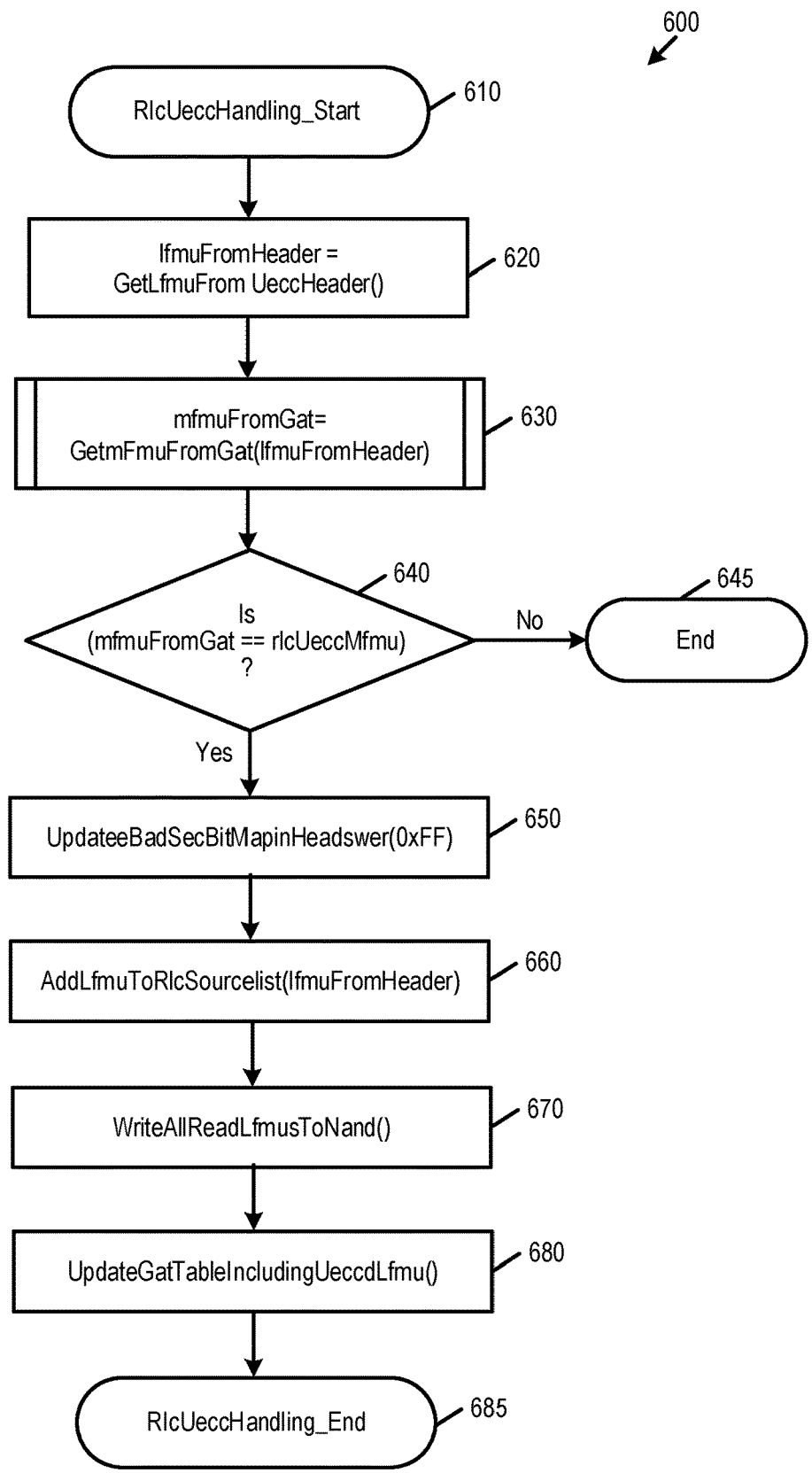
FIG. 6 is a flow chart of a method of an embodiment for releasing a source block having an uncorrectable error.

FIG. 6 is a flow chart 600 of an example implementation of releasing a garbage collection source block having an uncorrectable error. It should be understood that this is merely an example and that other implementations can be used. As shown in FIG. 6, after identifying an uncorrectable error in a portion of a source block (act 610), the controller 102 reads a logical address from a header of the portion of the source block (act 620), reads a logical address from an entry in a logical-to-physical address table that is associated with the physical address (act 630), and compares the two logical addresses (act 640). If the two logical addresses do not match, the method ends (act 645), leaving the portion in the source block. That is, the garbage collection operation is performed without copying the portion of the source block to the destination block. However, if the two logical addresses match, a bad sector bit map is updated (act 650), the portion is added to a list for relocation (act 660), and the portion is copied to the destination block (act 670). The entry in the logical-to-physical address table is updated after copying the portion of the source block to the destination block (act 680), and the relocation process ends (act 690).

So, in this example, a hypothesis is tested regarding whether the LFMU in the header (which is just a few bytes) is not corrupted, although the data segment (most of the 4 KB FMU) is corrupted. The controller 102 decodes the LFMU, gets the block number and the offset in the GAT, and then updates the GAT. In this method, the FTL can get the UECC data (e.g., decoded by low-density parity check (LDPC) with a syndrome weight (SW) indication) and assume that there are no bit flips in that LFMU indication data. In this example, the LFMU data is eight bytes in a four KB fragment. So, it is a fair assumption to at least start with. Once the LFMU information is available, the controller 102 can check in the corresponding L2P page, get the MFMU (MetaBlock FMU) information from L2P entry, and verify if the MFMU from the L2P page matches that of the source MetaBlock with the identified UECC fragment. If it matches, the FTL knows that the initial assumption is true and that the eight bytes of LFMU are safe (bits indicating LFMU are not flipped there at least). Thus, the hypothesis is validated, and there is no speculation in handling. Once ther LFMU is confirmed, it updates the L2P page accordingly. The data still has an UECC and may be of no use. However, updating the L2P enables the FTL to release the source block for further usage, thereby positively impacting system resources.

Figure 7A:
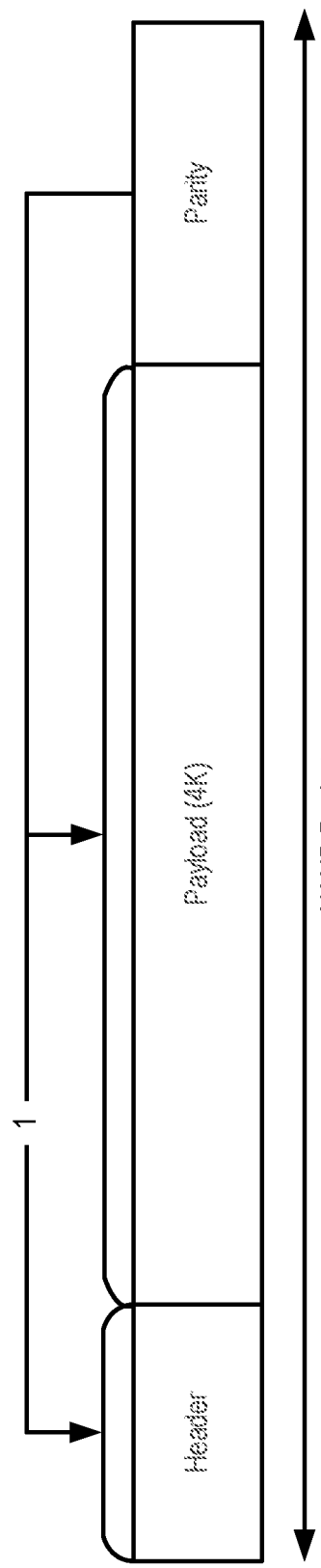
FIGS. 7A and 7B are illustrations of packet structures of embodiments.
Figure 7B:
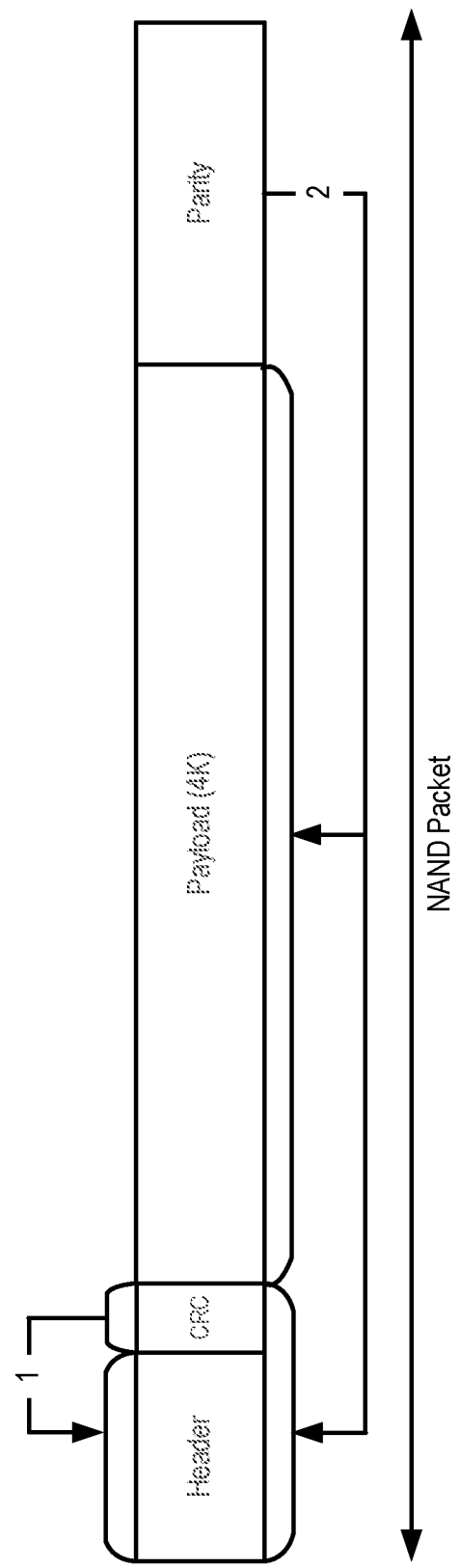

Many alternatives are possible. For example, in another embodiment, the logical address in the header of a cluster is protected using parity bits (e.g., cyclic redundancy check (CRC) parity). In this embodiment, when an uncorrectable error is detected in a cluster, the controller 102 can check, using the header's parity bits, whether any error is detected in the logical address in the header (e.g., in the header's LFMU). If there is, the controller 102 can attempt to correct the parity using the parity bits to get the logical address. This is illustrated in FIGS. 7A and 7B. FIG. 7A shows a NAND packet structure where parity bits at the end of the packet protect both the header and the payload. FIG. 7B shows CRC parity bit(s) providing an extra layer of protection, as noted above. As shown in FIG. 7B, the size of header can remain the same, as a reserved byte in the header can be used to store the parity bits. In one embodiment, two bytes of parity are used, although other parity sizes can be used.

Figure 8:
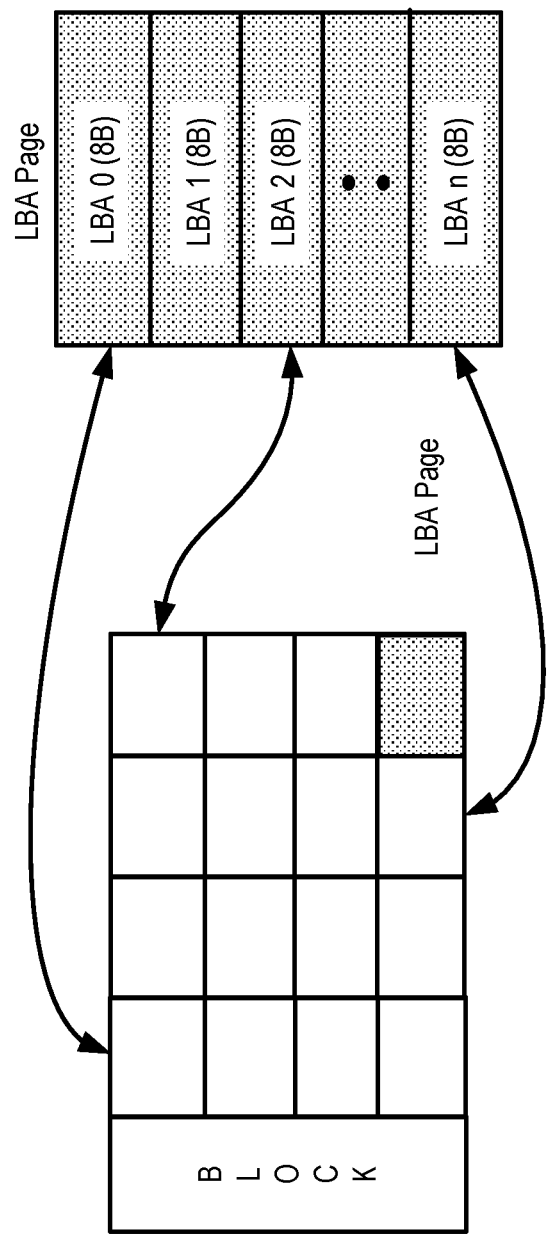
FIG. 8 is an illustration of an embodiment in which a page in a block stores a list of logical addresses for all of the pages in the block.

In yet another embodiment, a list of all LBA in a block/page are stored along with host data in a last page of the block. FIG. 8 shows an illustration of an embodiment in which a page in a block stores a list of logical addresses for all of the pages in the block. In this embodiment, when an uncorrectable error occurs, the controller 102 can read the LBA page from the memory 104 and calculate the offset from the uncorrectable-error-reported LFMU. Once the LBA information is available, the controller 102 can update the header with this LBA information and set the uncorrectable error bitmap in the header and continue with the relocation. This ensures that if there is an uncorrectable error while performing garbage collection, the uncorrectable error is fixed and updated in header, so the block/page can be moved to the destination block. The controller 102 can also update the GAT with the new location. In this way, VCC would become zero, and the block can be immediately freed. When the host 300 issues a read for the LBA that encountered the uncorrectable error, the controller 102 can read from the proper location and return the appropriate data to the host 300.

Figure 9:
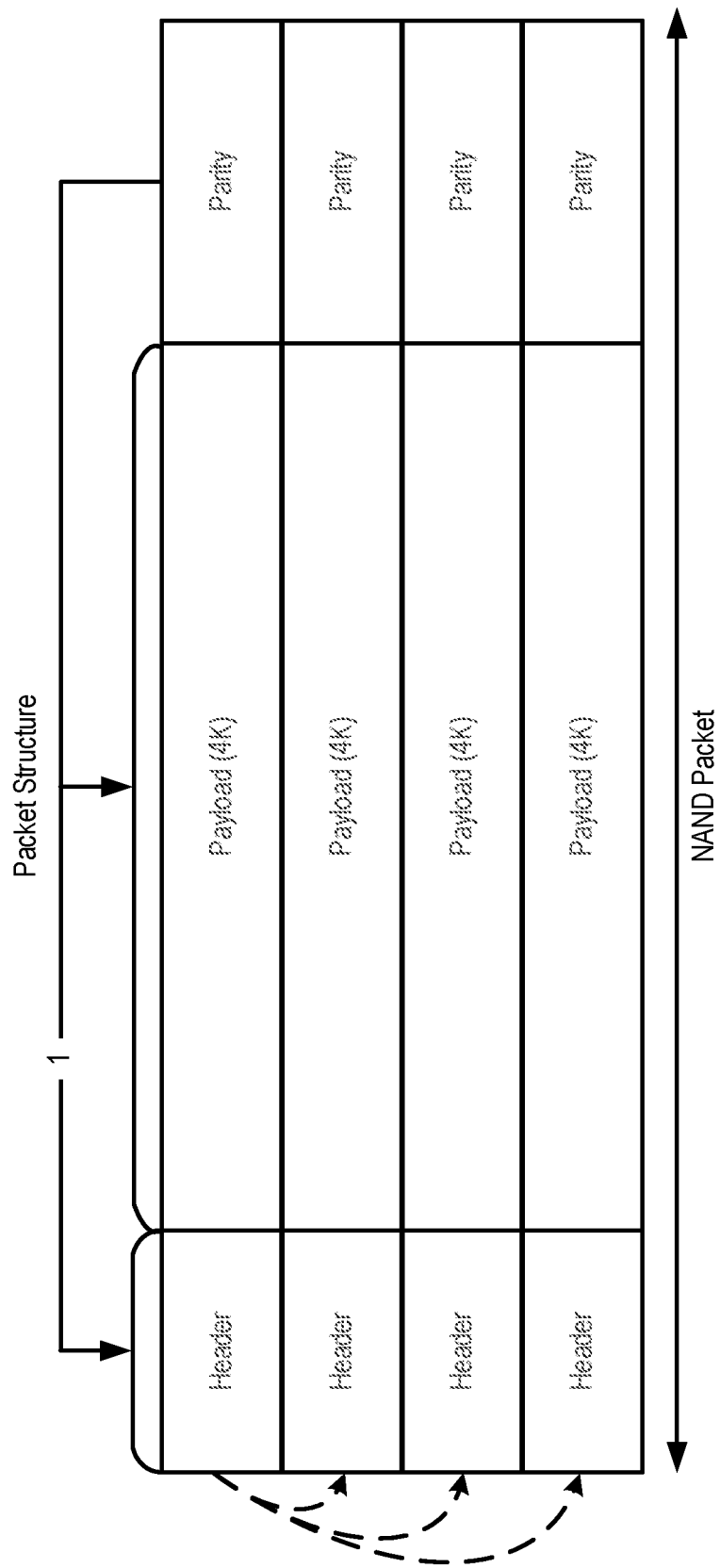
FIG. 9 is an illustration of a packet structure of an embodiment.

In yet another embodiment (see FIG. 9), once a fragment encounters an uncorrectable error in its address header, the controller 102 can check the header of a neighboring fragment, get its address, and check its corresponding L2P page entry to see if the failing fragment is sequential to the neighboring fragment (or random without any logical address information). If it is sequential, the controller 102 can mark the data as having an uncorrectable error and update the L2P page. However, if it is random (meaning that the neighboring L2P entry does not point to the source block), the controller 102 can perform one of the other embodiments discussed above.

Figure 10:
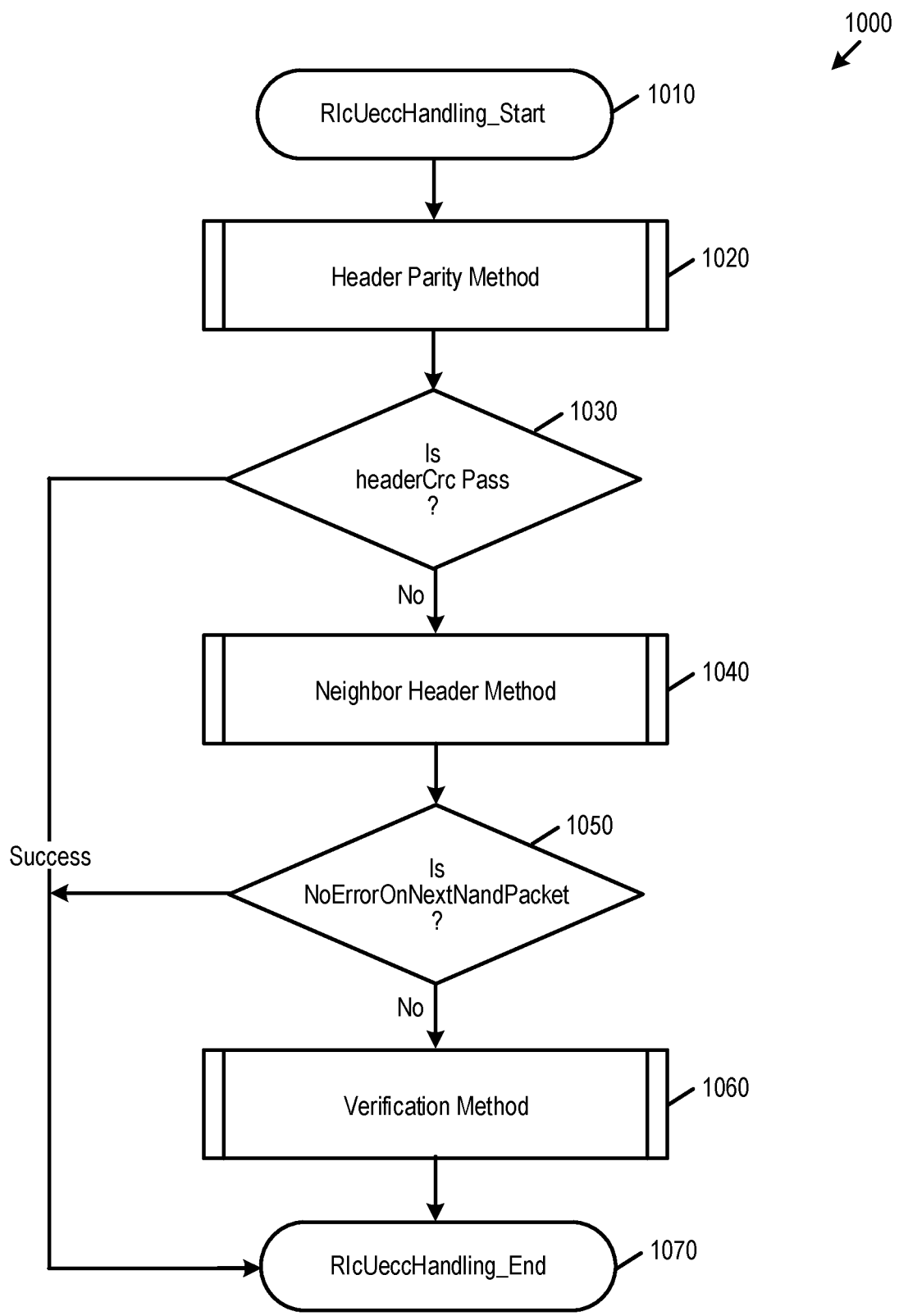
FIG. 10 is a flow chart of a method of an embodiment for releasing a source block having an uncorrectable error.

As noted above, the various embodiments described herein can be used in combination. FIG. 10 is a flow chart

1300 that shows one such combination. It is important to note that this is merely an example and that other combinations can be used. As shown in FIG. 10, at the start (act 1010) of the garbage collection operation when an uncorrectable error in the logical address in countered, the "header parity" embodiment can be used (act 1020). The controller 102 can then determine if the header parity addressed the problem (act 1030). If it did not, the controller 102 can then perform the "neighboring fragment" embodiment (act 1040). The controller 102 then checks if that was successful (act 1050). If it was not, the controller 102 can perform the "verification" embodiment (act 1060) and perform the relocation (act 1070).

There are several advantages associated with these embodiments. For example, as the number of zombie blocks increases, there may be a shortage of free blocks available after prolonged use of the data storage device. Also, the wear levelling algorithm can be impacted because of the PEC of the zombie block. These embodiments avoid these problems, allowing the complete memory to be available to the host at any given time.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   a processor coupled with the memory and configured to perform the following during a garbage collection operation:
   (a) determine that an uncorrectable error exists in a portion of a source block, wherein the portion is located at a physical address in the memory;
   (b) read a logical address from a header of the portion of the source block;
   (c) compare the logical address read from the header with a logical address read from an entry in a logical-to-physical address table that is associated with the physical address; and
   (d) in response to the logical address read from the header matching the logical address read from the entry in the logical-to-physical address table, copy the portion of the source block to a destination block.

2. The data storage device of claim 1, wherein the processor is further configured to:
   in response to the logical address read from the header not matching the logical address read from the entry in the logical-to-physical address table, performing the garbage collection operation without copying the portion of the source block to the destination block.

3. The data storage device of claim 1, wherein the uncorrectable error is in a data payload of the portion of the source block, which is confirmed by comparing the logical address read from the header with the logical address read from the entry in the logical-to-physical address table.

4. The data storage device of claim 1, wherein the processor is further configured to:
   update the entry in the logical-to-physical address table after copying the portion of the source block to the destination block.

5. The data storage device of claim 1, wherein:
   a first set of parity bits protects the logical address in the header;
   a second set of parity bits protects the portion; and
   the processor is further configured to:
      determine that an error exists in the header that is uncorrectable by the second set of parity bits; and
      attempt to correct the error in the header using the second set of parity bits.

6. The data storage device of claim 5, wherein the processor is further configured to:
   in response to the attempt being successful, copy the portion of the source block to the destination block.

7. The data storage device of claim 5, wherein the processor is further configured to perform (b)-(d) in response to the attempt not being successful.

8. The data storage device of claim 5, wherein the first set of parity bits comprises cyclic redundancy check (CRC) parity bits.

9. The data storage device of claim 1, wherein the processor is further configured to:
   in response to determining that the uncorrectable error exists:
      obtain a logical address from a header of a neighboring portion;
      determine a physical address associated with the logical address of the neighboring portion; and
      in response to the physical address of the portion being sequential to the physical address associated with the logical address of the neighboring portion, mark the portion as uncorrectable.

10. The data storage device of claim 9, wherein the processor is further configured to perform (b)-(d) in response to the physical address not being sequential.

11. The data storage device of claim 1, wherein the memory comprises a three-dimensional memory.

12. In a data storage device comprising a memory comprising a source block comprising a plurality of pages, wherein one of the plurality of pages stores a list of logical addresses of the other ones of the plurality of pages, a method comprising:
    determining that an uncorrectable error exists that prevents a logical address written in a header of a page from being read;
    calculating the logical address from the list of logical block addresses;
    writing the calculated logical address in the page; and
    relocating the source block to a destination block, wherein by being stored in a page in the source block, the list of logical addresses is relocated to the destination block.

13. The method of claim 12, further comprising:
    updating an entry in a logical-to-physical address table after relocating the source block to the destination block.

14. The method of claim 12, wherein the page that stores the list of logical block addresses is a last page of the source block.

15. The method of claim 14, wherein the last page also stores data.

16. The method of claim 12, wherein the memory comprises a three-dimensional memory.

17. A data storage device comprising:
    a memory; and
    means for:

determining that an uncorrectable error exists in a portion of a source block, wherein the portion is located at a physical address in the memory;

reading a logical address from a header of the portion of the source block;

comparing the logical address read from the header with a logical address read from an entry in a logical-to-physical address table that is associated with the physical address; and copying the portion of the source block to a destination block in response to the logical address read from the header matching the logical address read from the entry in the logical-to-physical address table.

18. The data storage device of claim 17, wherein the uncorrectable error is uncorrectable using a first set of parity bits, and wherein the data storage device further comprises:

means for using a second set parity bits to attempt to correct the error that is uncorrectable using the first set of parity bits.

19. The data storage device of claim 17, further comprising:

means for using a logical address from a neighboring portion to attempt to perform garbage collection on the source block.

20. The data storage device of claim 17, further comprising:

means for using a list of logical addresses in the source block to attempt to perform garbage collection on the source block.

* * * * *